(12) United States Patent
van Oostrom et al.

(10) Patent No.: US 6,921,267 B2
(45) Date of Patent: Jul. 26, 2005

(54) LUNG SIMULATOR FOR AN INTEGRATED HUMAN PATIENT SIMULATOR

(75) Inventors: Johannes H. van Oostrom, Gainesville, FL (US); Venkata Meka, Seabrook, TX (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 411 days.

(21) Appl. No.: 10/313,360

(22) Filed: Dec. 6, 2002

(65) Prior Publication Data

US 2004/0110117 A1 Jun. 10, 2004

(51) Int. Cl.$^7$ .............................................. G09B 23/28
(52) U.S. Cl. ..................................... 434/272; 434/262
(58) Field of Search ...................... 434/262, 265–268, 434/272.2, 75, 365; 128/200.24, 204.24, 204.26; 623/9; 73/28.04; 446/24

(56) References Cited

U.S. PATENT DOCUMENTS

| | | | | |
|---|---|---|---|---|
| 3,154,881 A | * | 11/1964 | Elwell | 446/24 |
| 4,001,950 A | * | 1/1977 | Blumensaadt | 434/265 |
| 4,167,070 A | * | 9/1979 | Orden | 434/272 |
| 5,584,701 A | | 12/1996 | Lampotang et al. | |
| 5,597,310 A | * | 1/1997 | Edde | 434/272 |
| 5,611,335 A | * | 3/1997 | Makhoul et al. | 128/204.24 |
| 5,622,164 A | * | 4/1997 | Kilis et al. | 128/200.24 |
| 5,769,641 A | | 6/1998 | Lampotang et al. | |
| 5,772,442 A | | 6/1998 | Lampotang et al. | |
| 5,779,484 A | | 7/1998 | Lampotang et al. | |
| 5,834,628 A | * | 11/1998 | Hunter et al. | 73/28.04 |
| 5,868,579 A | | 2/1999 | Lampotang et al. | |
| 5,882,207 A | | 3/1999 | Lampotang et al. | |
| 5,890,908 A | | 4/1999 | Lampotang et al. | |
| 5,941,710 A | | 8/1999 | Lampotang et al. | |
| 6,273,728 B1 | | 8/2001 | van Meurs et al. | |
| 6,296,490 B1 | * | 10/2001 | Bowden | 434/265 |
| 6,679,259 B2 | * | 1/2004 | Heesch | 128/204.26 |
| 2002/0143397 A1 | * | 10/2002 | von Segesser | 623/9 |

OTHER PUBLICATIONS

Guyton, A.C. Textbook of Medical Physiology (8$^{th}$ ed.), W.B. Saunders Co., Philadelphia, 1991.

* cited by examiner

Primary Examiner—Joe H. Cheng
(74) Attorney, Agent, or Firm—Miles & Stockbridge P.C.; Dennis P. Clarke

(57) ABSTRACT

A simulated lung for use in real time simulated medical procedures comprising a positive pressure source of a gas, a vacuum pressure source, a fixed interior volume vessel having an inlet, an outlet, and a breath passage port, the inlet in communication with the positive pressure source, and the outlet in communication with the vacuum pressure source, a first flow valve intermediate the positive pressure source and the inlet, a second flow valve intermediate the vacuum pressure source and the outlet, a pressure sensor in communication with the interior volume of the vessel, and means for continuously evaluating a pressure signal generated by the pressure sensor to a desired pressure level within the vessel during the breathing cycle such that a flow of gas entering and exiting the breath passage port of the vessel is synchronized with a predetermined desired flow rate of breathing during the breathing cycle. The desired pressure level depends upon any one of i) a time and event based script, ii) a computer model, iii) or a combination of a time and event based script and a computer model based on a physiological state of a simulated patient.

22 Claims, 6 Drawing Sheets

LUNG SIMULATOR FOR AN INTEGRATED HUMAN PATIENT SIMULATOR

BACKGROUND

1. Field of the Invention

This invention related to an integrated human patient simulator and methods of using same. In particular, this invention relates to a lung simulator for use in a patient mannikin capable of producing real time "breaths" during the inhalation and exhalation phases of a breathing cycle during a patient treatment simulation.

2. Background of the Invention

Currently, a new resident in a medical specialty will receive a very limited duration of didactic teaching about the principles of a particular medical procedure before delivering care to his/her first real patient. The resident is then faced with a new and unfamiliar environment while bearing the tremendous responsibility of caring for ill patients. Similarly, experience physicians who require continuing medical education, refresher courses, or familiarization with newly introduced and/or technologically sophisticated equipment or procedure do not have the opportunity for hands-on practice in a realistic environment without risk to a patient.

Human patient simulators, such as disclosed in U.S. Pat. Nos. 5,584,701; 5,769,641; 5,772,442; 5,772,443; 5,779,484; 5,868,579; 5,882,207; 5,890,908; 5,941,710; and 6,273,728, are used to address the above-mentioned deficiencies in medical, allied health care and veterinary education. The lung simulator described herein comprises a further embodiment of a patient simulator, particularly a self-regulating integrated human patient simulator. An example of a patient simulator, the Human Patient Simulatorm™ (HPS), is manufactured by Medical Education Technologies, Inc.

An integrated human patient simulator, such as the HPS, provides a clinician with valuable experiences that otherwise would not be possible outside of experiencing the actual medical situation in a clinical environment. The simulator allows the use of an interactive system to gain experience in managing both usual and unusual problems before the clinician actually cares for a patient. Further, with such simulators, clinicians can practice usual and unusual situations repetitively and try different interventions to achieve the best outcome.

In human organisms, the primary purpose of the lungs is to bring atmospheric air into contact with the blood. The process of moving gas in and out of the lungs is referred to as pulmonary ventilation, and the process of exchanging oxygen and carbon dioxide between air and blood is called respiration. A single breath or respiratory cycle consists of inspiration (inhalation) and expiration (exhalation). During a breath cycle, intrapulmonary pressure changes occur due to the expansion and contraction of the thoracic cavity, which prompts airflow in and out of the lungs.

In one prior art example, the "lung" of a simulator, such as used in the HPS, is comprised of at least one bellows and normally is comprised of a pair of bellows. One embodiment of a "bellows" lung simulator is disclosed in U.S. Pat. No. 5,584,701, which issued to Lampotang, et al., and which is incorporated by reference herein. The bellows are a physical representation of the lungs and movement of air to and from the bellows is similar to airflow in and out of the lungs when breathing. Typically, a piston is used to adjust the volume of the bellows such that the alveolar pressure inside the bellows is equal to a composite pressure determined by a lung model. The piston is normally adjusted by a manual pressure regulator or an electronic pressure regulator.

Using a "bellows" lung in a patient simulator causes several implementation and simulation problems. First, the bellows are typically large scale, extending upwards of 12 inches in diameter and 12 inches in height, which makes them difficult, if not impossible, to fit within the mannikin. Thus, they are normally attached to the mannikin by hoses that increase the anatomical dead space. Second, the bellow's material defines the compliance characteristic of the lung, which limits the compliance characteristic in the lung model, and which can by adjusted only within a limited range with the pistons. Third, the bellows are restricted to implementing a two-compartment lung model, which make it difficult to simulate complex higher order models, and which, due to the passive nature of the two-compartment lung model, do not provide a good simulation for spontaneous respiration. Finally, different sets of bellows must be used to simulate pediatric and adult profiles.

Another example of a known lung simulator for a patient simulator is a cylinder-piston mechanism, such as the servo lung simulator manufactured by IngMar Medical. This design calls for a cylinder with a computer-controlled mechanical piston that changes the internal volume of the cylinder to simulate breathing. The control of the piston is based on a two-compartment lung model. Because the volume of the cylinder must accommodate the largest tidal volume possible, the cylinder cannot fit within the mannikin. Furthermore, the piston creates mechanical problems and requires high maintenance for accurate simulations.

Yet another example of a known lung simulator is a slit/cam valve lung simulator. Here, a computer controls the opening of the slit/cam valve bases on a lung model. The slit/cam valve is used to pulsate gas flow to achieve only very simple flow patterns, such as, for example, cyclic flows.

Thus, there is a need for a lung simulator that is small enough to fit within the mannikin if desired; that allows the selection of any parameter values for the lung model; that can simulate both simple and complex breathing patterns; and that is flexible enough to simulate any type of physical profile, whether it be an adult or child, without changing any hardware components.

SUMMARY OF THE INVENTION

The present invention meets this need by providing a lung simulator for a mannikin for use in an integrated human patient simulator during simulated medical procedures. The lung simulator simulates breathing in real time during a breathing cycle in the patient simulator and includes a positive pressure source of a gas, a vacuum pressure source, and a vessel having an inlet, a outlet, a breath passage port, and defining a fixed interior volume. The inlet of the vessel is in fluid communication with the positive pressure source and the outlet of the vessel is in communication with the vacuum pressure source. The breath passage port of the vessel is coupled to the manakin's simulated trachea so that "breaths" entering and exiting the lung simulator can be communicated to/from the mouth of the manakin.

The lung simulator further has a plurality of regulating means, a pressure sensor, and a means for continuously evaluating a pressure signal generated by the pressure sensor. The plurality of regulating means may include a first regulating means and a second regulating means. The first regulating means may be disposed intermediate and in fluid communication with the positive pressure source and the inlet of the vessel. The second regulating means may be disposed intermediate and in fluid communication with the vacuum pressure source and the outlet of the vessel.

The pressure sensor is disposed in communication with the interior volume of the vessel and generates the pressure signal based on the measured pressure of the gas within the vessel. The evaluating means compares the measured pressure to a determined desired pressure level within the vessel during the breathing cycle so that a flow of gas entering and exiting the breath passage port of the vessel is synchronized with a predetermined desired flow rate of breathing for the breathing cycle.

The determined desired pressure level is calculated based upon any one of i) a time and event based script, ii) a computer model, and iii) a combination of a time and event based script and a computer model based on a physiological state of a simulated patient. Based on the comparison of the pressure signal to the determined desired pressure level, the evaluating means generates a response signal. The lung simulator further includes a feedback means, responsive to the response signal, that is adapted to adjust at least one of the regulating means. Thus, in use, the lung simulator tracks and maintains the desired pressure level within the interior volume of the vessel.

BRIEF DESCRIPTION OF THE FIGURES

These and other features and aspects of the present invention will become better understood with reference to the following description, appended claims, and accompanying drawings, where:

DETAILED DESCRIPTION OF THE INVENTION

Figure 1:
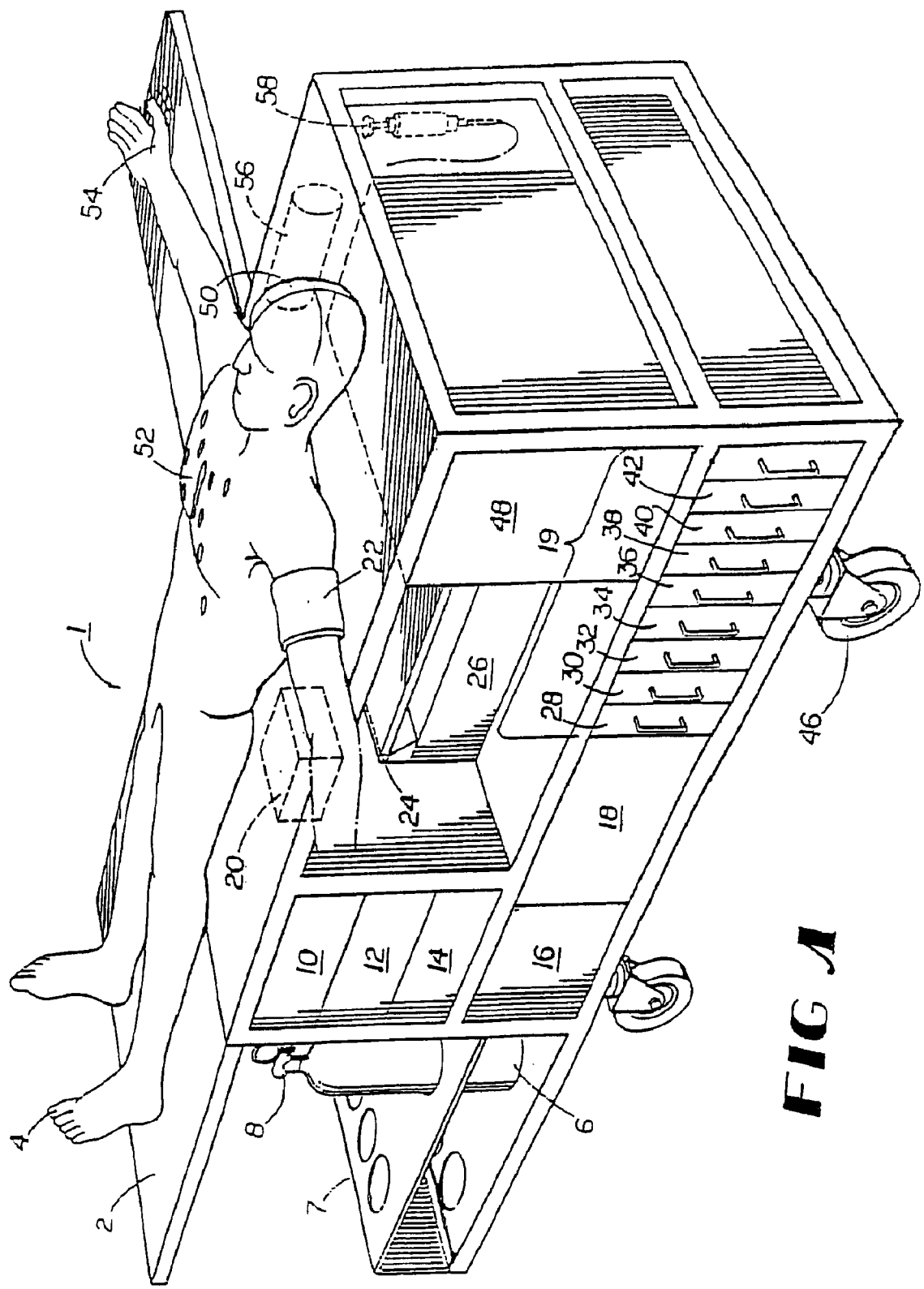
FIG. 1 is a perspective full view of a conventional integrated patient simulator with the subsystems included therein indicated.

The present invention is more particularly described in the following exemplary embodiments that are intended as illustrative only since numerous modifications and variations therein will be apparent to those skilled in the art. As used herein, "a," "an," or "the" can mean one or more, depending upon the context in which it is used. The preferred embodiments are now described with reference to the figures, in which like reference characters indicate like parts throughout the several views.

Conventional integrated human patient simulators, such as, for example, the Human Patient Simulator™ (HPS) manufactured by Medical Education Technologies, Inc., are fully interactive, life-like simulators used to train clinicians at all levels of medical education. In the integrated human patient simulator, sophisticated physiological and pharmacological mathematical models control mechanical actuators embedded in an adult-size mannikin to create life-like physical signs and symptoms (i.e., heart/breath sounds, palpable pulses, self-regulating spontaneous breathing, etc.) that healthcare professions use to make clinical diagnosis and to glide therapeutic interventions.

Typically, an integrated human patient simulator covers the following subsystems: cardiovascular; uptake and distribution; neuromuscular; pharmacokinetics/pharmacodynamics and physiologic control models. The different subsystems are linked to realistically simulate the interactions between the subsystems and the control system in response to the actions of a trainee, student, or other user (including input from both a computer peripheral such as a mouse/keyboard, wired remote keypad, wireless remote control unit, barcode reader and from sensors physically embedded in the full scale lung/patient simulator).

A significant part of a patient simulator useful for training anesthesiologists and other physicians comprises a subsystem to perform lung mechanics and, in addition, may perform gas exchange. The lung simulator on the instant integrated patient simulator may consume and produce gases, just like a human lung. Uptake and excretion of $O_2$, $CO_2$, $N_2$, $N_2O$ may be physically created and simulated, based on a software model representing uptake, distribution, storage, consumption, and/or production in the body. Lung perfusion is also accounted for in this model by modeling of the cardiovascular subsystem of the patient being simulated by the physiological model. Alveolar ventilation is dependent on the lung mechanics and, in the case of spontaneous breathing, is driven by the physiologic control and pharmacokinetics/pharmacodynamics models. See Guyton, A. C., *Textbook of Medical Physiology* (8th ed.), W. B. Saunders Co., Philadelphia, 1991.

The lung simulator portion of the integrated human patient simulator is capable of simulating spontaneous breathing with computer control of tidal volume (VT) and respiratory rate (RR). Production of desired breathing patterns is driven by a response signal and feedback means to simulate inspiration, active expiration, coughing, and different spontaneous breathing patterns (I/E [inhalation/exhalation] ratio, respiratory rate, respiratory patterns associated with light anesthesia). The response signal is converted by a digital to analog converter and directed to the regulating means of the lung simulator to regulate the production of desired breathing. Depression of spontaneous breathing by the influence of anesthetic drugs on the respiratory center and/or by the effect of muscle relaxants directly on the respiratory muscles is provided by the pharmacokinetic/pharmacodynamic software models. In addition, normal and abnormal breath sounds may be synchronized with the generated breaths.

Furthermore, variable resistances under software control can be varied during the respiratory cycle to simulate partial collapse of the airways during expiration. This variability includes non-linear computer controlled compliances (i.e., the inverse of the stiffness of the lung) and computer controlled functional residual capacity (FRC). Existing simulators with lung modeled are capable of linear compliance only. This is unrealistic in that the human lung exhibits a compliance (volume versus pressure) curve which is sigmoidal in nature. Non-linear compliances allow for the simulation of variable stiffness of the lung. Compliances and target or modeled intrapleural volumes or lung simulator vessel pressures are under software control.

The physiological software models create a self-regulating lung simulator that changes its own breathing pattern in accordance with the ongoing simulation. The lung simulator of the present invention and its self-regulating software model create spontaneous breaths of variable size and shape along with independently variable compliance and independently variable bronchial resistance. Thus, the lung simulator disclosed herein, for use in an integrated human patient simulator, contains a hybrid (mechanical and mathematical) lung model that regulates itself.

The integrated human patient simulator provides a robust system which reacts upon user interaction with the lung simulator of the present invention (for example, if the user changes the inspired gas composition). Thus, when a user changes the inspired gas composition, this change causes changes to the physically simulated alveolar concentrations of the various gases. The physiological model will then determine the effects of these changes in gas concentrations in the lung and, in fact, upon the entire physiological state of the integrated human patient simulator, and then determines an instant desired pressure level within the interior of the vessel of the lung simulator. The lung simulator simulates these changes in required breathing patterns in response to the generated response signal (for example, by decreasing spontaneous breathing). Furthermore, the user may react to these changes by further changing the inspired gas composition, and thus initiating a cyclical repeat of the interactive steps described above.

Referring now to FIG. 1, it is helpful to gain a general understanding of the spatial orientation of the various subsystems in a conventional integrated human patient simulator 1. The patient simulator 1 consists of a mannikin 4 placed atop a table 2. The table 2 itself is of the same physical dimensions as tables used in operating rooms and hospitals. Interposed in various positions below the table are the control and implementation devices associated with several of the subsystems of the HPS.

Mannikin 4 is constructed of plastic and may have a means 54 for effecting a thumb twitch. In addition, area 52 of the mannikin indicates the general area for placement of heart and lung sound devices subcutaneous to the mannikin 4. A head 50 (Laerdal Medical Corp., Armonk, N.Y.) is provided attached to the mannikin 4. Head 50 typically contains the mechanism for simulation of difficult airway and means for permitting cricothyrotomy. Normally attached to one arm of mannikin 4 is a non-invasive blood pressure monitor (NIBPM) 22.

Interposed beneath the table 2 of the HPS are various devices which will now be described in more detail. As one will appreciate, the various devices below the table shown in FIG. 1 may be stored in cabinets separate from but in operative communication with the mannikin. Gas cylinders 6 are situated near the foot end of the mannikin 4 in an array of gas cylinder holders 7. Cylinders 6 for $O_2$, $CO_2$, $N_2$ and $N_2O$ are provided. However, cylinders of other gases may be added depending on need. A pulse oximeter simulator 10 may be provided to stimulate the pulse oximeter. An IV drug collection vessel with a digital scale (Denver Instrument Co., Arvada, Colo.) may be provided. Collectively labeled 12, a NIBPM simulator 14, which interfaces with NIBPM 22 and module 36 which in turn interfaces with the computer 16 may be provided. The computer 16 is situated next to a power supply 18 capable of powering the complete HPS 1.

The integrated human patient simulator has a multiplexer 20 responsible for the routing and handling of data signals for inputs and outputs. Adjacent to multiplexer 20 and power supply 18, is interposed a rack 19 of plug in modules. In one conventional embodiment of the integrated human patient simulator, the modules include: module 28, responsible for the generation of heart sounds; module 30, responsible for the generation of the ECG; module 32, responsible for generating lung and breath sounds; module 34, responsible for portions of the lung simulator 100; module 36, responsible for the palpable pulses (not shown), NIBPM 22 and bronchial resistances, module 38, responsible for the drug identification and quantification subsystems; module 40, included for simulating machine and/or equipment failures of an anesthesia machine, and finally, module 42 drives the thumb twitch mechanism 54. The order of modules is unimportant, and, depending upon the complexity of the integrated human patient simulator desired, other modules may be included in an expanded rack 19.

In the integrated human patient simulator, the various subsystems are typically connected as follows. Signals from computer 16 are routed through multiplexer 20 and to the rack 19 of modules. Appropriate inputs are determined from sensors placed throughout the mannikin. In addition, various outputs are routed through the multiplexer 20 and via the modules to appropriate output devices, e.g., production of physiologically correct breathing from the lung simulator.

By "physiological model," it is intended that the computer 16 may regulate the behavior and interaction of the various subsystems so that they behave in a manner consistent with a human patient. Thus, depending upon the parameters, e.g., sex, age, body mass cardiac output, shunt fraction, etc., the current invention allows the simulation of healthy and diseased (e.g., emphysema) patients of various ages and both genders. Other models may be rendered limited only by the scope of modeling desired. A particular desired physiological model could be rendered by one skilled in the an with knowledge of the mathematical behavior of the systems to be simulated.

By "physiological state," it is meant the totality of all physically relevant data, e.g., blood pressure, heart rate and cardiac outputs. The physiological state may include simulated temperature, gas content in the lungs, anesthetic drug involved including quantity and other information. In addition, compliance of the lung, whether the patient is exhaling or inhaling, has a difficult airway or bronchial resistance are all factors which in their totality will dictate the physiological state of the patient simulator 1. The list just described is expressly meant to be non-limiting, and the particular physiological information tracked will depend upon the particular embodiment desired and the relevant physiological model. The information about the physiological state constitutes the data used by computer 16 in implementing a particular physiological model.

By "programmed computing means," it is meant the combination of the computer 16 which controls the single board computers, which manage the various subsystems of the current patient simulator 1. The programmed computing means thus exists atop a distributed processing network as known to those skilled in the art. The necessity to convert digital inputs and outputs to analog inputs and outputs is modeled as appropriate but such devices are generally not shown in the schematic figures. However, one skilled in the an would readily be able to determine their necessity and implementation.

As noted above, the integrated human patient simulator is control led from a main system PC console. The user has the freedom to configure patient profiles, scenarios, and control the flow of simulation exercise while monitoring patient parameters, drugs administered, and other interventions. The patient profiles are based on age, gender, physiological parameters, and medical history. A scenario is a set of commands that instruct the simulator to react in a specific manner. Scenarios are used to determine the initial and subsequent physiological states as well as the different conditions that arise during simulation exercise. The patient parameters are observed via standard patient monitors to enable the user with the ability to interact with actual equipment used in clinical setting. Physiological models generate the appropriate signals that drive the patient monitoring equipment in a realistic way.

The integrated human patient simulator is designed in a way that allows users to modify and configure the simulator to meet their needs. In one example, the integrated human patient simulator is operated using an open system architecture, such as the Ellis Operating System (EOS). The advanced features of such an open system architecture allow users to acquire and control internal system functions and variables of the EOS. Using the appropriate protocol, such as the integrated human patient simulator's Internal Data Exchange Protocol (HIDEP), users can write software that allows external devices and computers to communicate with the integrated human patient simulator.

Thus, time and event based scripts are run based on the computer 16 intervention or instructor intervention with the system. The events may be scripted or non-scripted as appropriate for the desired simulated application. A combination of time- and event-based scripts is possible where needed. For instance, an instructor may determine that a difficult airway situation should arise by using an event-based script. In response, the physiological model is used to model the behavior of the simulator in response to the scripted difficult airway event which is physically created. The scripts readily interface with the physiological state information as well as the physiological model.

The specific embodiments of the lung simulator 100 for use in the integrated human patient simulator I are disclosed more fully in the following non-limiting examples of the best mode of carrying out the invention.

During simulated spontaneous breathing, the breathing software model determines a desired pressure level of the gas within a vessel of the lung simulator 100 based on the desired physiological breathing pattern. A comparison of the desired pressure level of the gas and the actual pressure level of the gas within the vessel drives the mechanical lung simulator in the instant human patient simulator 1 by generating breaths of variable amplitude and frequency in accordance with the desired breathing pattern.

Figure 2:
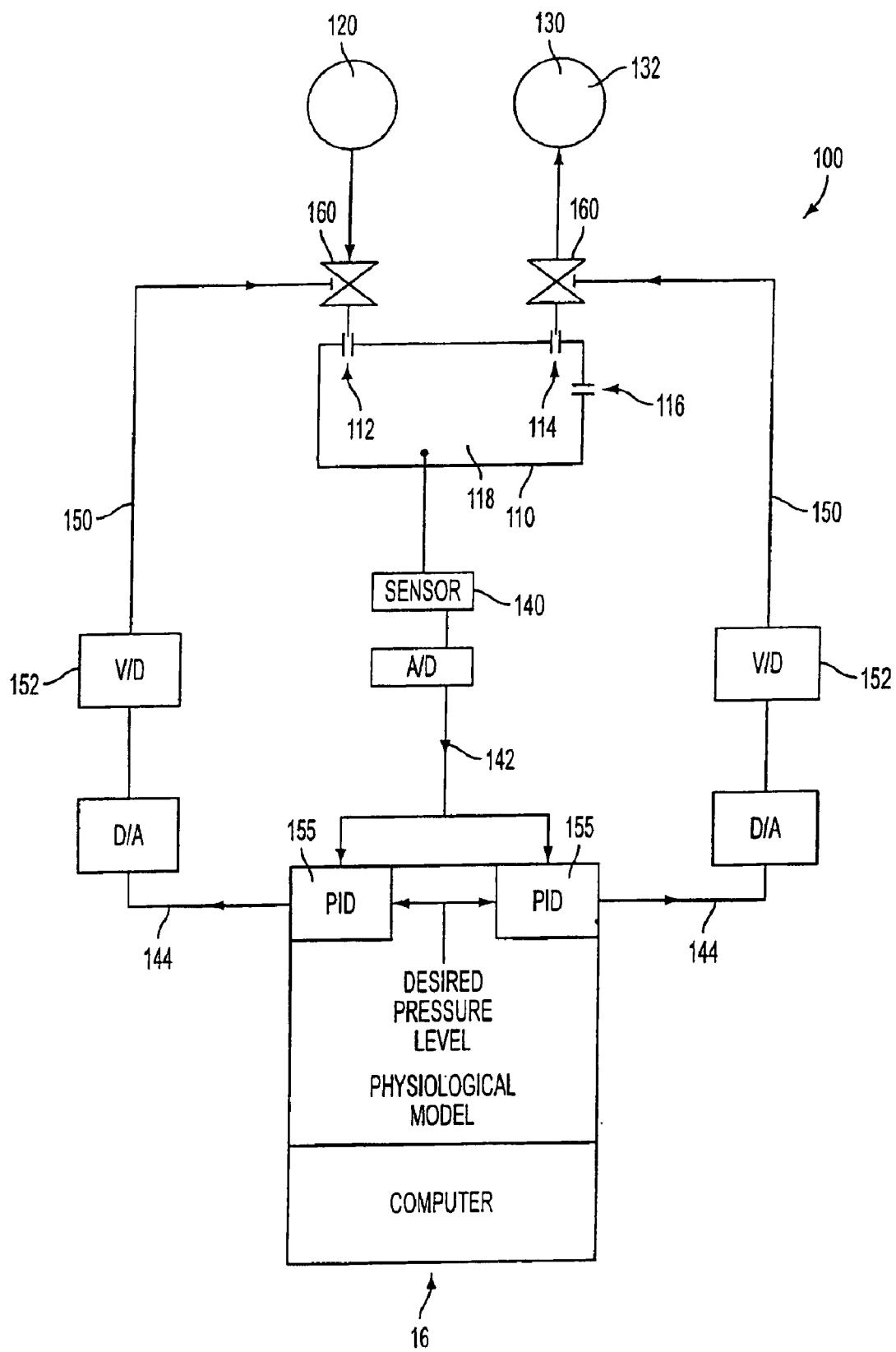
FIG. 2 is a schematic view of one embodiment of the lung simulator of the present invention for use in an integrated patient simulator.
Figure 3:
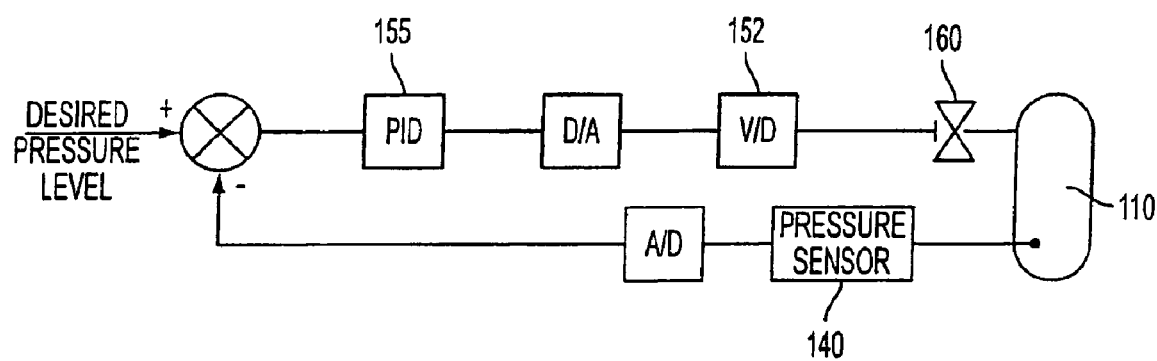
FIG. 3 is a schematic of a embodiment of a driver circuit adapted to adjust one of the regulating means of the lung simulator to vary the flow rate of gas passed through the respective regulating means during a breathing cycle.

The present invention comprises a lung simulator 100 for use in an integrated human patient simulator 1, as shown generally in FIG. 1. Referring now to FIGS. 2 and 3, the lung simulator 100 of the present invention simulates breathing in real time during a breathing cycle in the integrated human patient simulator and includes a vessel 110, a positive pressure source of gas 120, a vacuum pressure source 130, a plurality of regulating means for controlling the fluid communication between the vessel and the positive and vacuum pressure sources; a pressure sensor 140 for sensing the pressure of gas within the vessel, and means for continuously evaluating a desired pressure level within the vessel.

The vessel 110 has an inlet 112, an outlet 114, and a breath passage port 116. The vessel defines a fixed interior volume 118. In one example, the vessel is cylindrical in shape and is made of polyvinylchloride (PVC). The cylindrical shape helps to reduce turbulent gas flow inside the vessel and the PCT vessel is sufficiently stiff so that the vessel will not cave in at applied high or low pressures. Of course, other shapes and materials are contemplated which are sufficiently rigid so that the interior volume of the vessel remains fixed. In order to provide a balance between pressure resolution and rise time, the vessel preferably has an interior volume of between about 0.3 and 1.5 liter, more preferably between about 0.35 and 1.0 liter, and, still more preferred, between about 0.4 and 0.9 liter. The vessel 110 is small enough to be positioned within the "chest" of the mannikin or, if desired, may be readily disposed within the integrated human patient simulator.

The breath passage port 116 of the vessel is in fluid communication with the simulated trachea of the manakin. The inlet 112 of the vessel is in fluid communication with the positive pressure source 120. Similarly, the outlet 114 of the vessel is in fluid communication with the vacuum pressure source 130. In one example, the positive pressure source 120 may comprise pressurized air that is normally supplied to rooms and laboratories in medical centers. Normally, a positive pressure source in a medical center supplies pressurized air at about 3520 cmH2O. Similarly, the vacuum pressure source 130 is also normally available in medical centers and typically generates a constant vacuum vacuum pressure of about 150 cmH2O. Alternatively, the vacuum pressure source 130 may comprise a conventional vacuum pump 132. Of course, the noted pressures for the positive and vacuum pressure sources 120, 130 are exemplary and are expressly meant to be non-limiting as other pressures may be used successfully with the lung simulator of the present invention. The positive pressure source and the vacuum pressure source may be accessed via a conventional wall outlet (not shown).

A plurality of regulating means are in operative communication with the respective positive and vacuum pressure sources. The plurality of regulating means may include a first regulating means and a second regulative means. The first regulating means is disposed intermediate and is in fluid communication with the positive pressure source 120 and the inlet 112 of the vessel so that the flow of pressurized gas to the inlet of the vessel may be controlled. The second regulating means is disposed intermediate and in fluid communication with the vacuum pressure source 130 so that the communication of the vacuum to the interior 118 of the vessel from the vacuum pressure source may be regulated.

The pressure sensor 140 is disposed in the interior 118 of the vessel 110. One example of a suitable pressure sensor is a Motorola MPX5050 series monolithic silicon pressure sensor. Typically, conventional electronic pressure sensors will generate an analog output that is proportionally scaled to the applied pressure. Here, the pressure sensor 140 generates a pressure signal 142 based on the measured instant pressure of the gas within the interior of the vessel.

The evaluation means is responsive to the pressure signal 142 and to the generated desired pressure level within the vessel,. As one will appreciate and as discussed above, the desired pressure level within the vessel is determined based upon any one of i) a time and event based script, ii) a computer model, and iii) a combination of a time and event based script and a computer model based on a physiological state of a simulated patient so that, at any moment within the simulated breathing cycle, a desired pressure level within the vessel is known. The continually updated desired pressure level provides a pressure within the vessel that allows for the flow of gas entering and exiting the breath passage port 116 of the vessel 110 to be synchronized with a predetermined desired flow rate of breathing throughout the breathing cycle.

The evaluating means compares the pressure signal 142, indicative of actual pressure within the vessel, to the desired pressure level and generates a response signal 144 based on the comparison. Preferably, the evaluating means comprises the computer 16 of the integrated human patient simulator, which is electrically coupled to the pressure sensor. Thus, the evaluating means tracks and maintains a desired pressure inside of the vessel 110.

The lung simulator 100 may also include feedback means adapted to adjust at least one of the regulating means. The feedback means is responsive to the pressure signal so that the pressure within the interior volume 118 of the vessel is maintained at the determined desired pressure level. Preferably the feedback means comprises at least one driver circuit 150 electrically coupled to the computer 16 and also electrically coupled to each respective regulating means. As one will appreciate, the driver circuits 150 adjust the regulating means based on electrical signals received from the computer 16 to vary the flow rate of gas passed through the respective regulating means and into the vessel 100 during the breathing cycle so that the pressure within the vessel matches the desired pressure level.

In one exemplified embodiment, each regulating means comprises a flow valve 160 defining a passage (not shown) through which a gas traverses and a conventional flow controlling means for adjusting the passage to change the rate of flow of the gas therethrough. The feedback means adjusts the flow control means of at least one flow valve 160, if necessary, so that the pressure of the gas within the vessel 110 is maintained at, or approximates, the desired pressure level throughout the breathing cycle. The flow valve 160 can be a binary valve, which is in either a fully open of a fully closed position, or, more preferably, a proportional valve, in which the passage is opened different amounts corresponding to various desired flow rates. Examples of suitable proportional flow valves include a Tecnocraft model 209090 proportional valve and a Tecnocraft model 202616.

In one example, the evaluating means may include a conventional Proportional-Integral-Derivative (PID) control scheme for control of the operation of the feedback means of the lung simulator of the present invention. Such PID controllers have been in use for many years and are the most widely used form of feedback controllers in the industry. Typically, in a PID compensated control system, error information, i.e., the difference between the desired input and the actual output, is used to supply the appropriate input so that the actual output value matches the desired input.

In this example, the first and second regulating means each has its own PID controller 155. Each PID controller is tuned independently for the respective regulating means it controls because a PID controller tuned on one valve 160 generally does not work for another valve due to different mechanical characteristics from regulating means to regulating means. In use, the PID controller adjusts the respective regulating means so that the pressure within the vessel 110 tracks the desired pressure level.

In one example of such a PID control scheme, the response signals 144 generated by the computer 16 to drive the regulating means are pulse width modulated signals to reduce magnetic hysteresis of the respective regulating means. In this example, the driver circuit 150 may include a pulse width modulating solenoid valve driver 152, such as, for example, the DRV101 from Burr Brown Corporation. As one will appreciate, the driver circuit 150 may also include an instrumentation amplifier, such as, for example, the INA 118 from Burr Brown Corporation, to remove the common-mode noise and a low-pass filter to remove unwanted low frequency signals. So, in one example, a low-pass filter with a low cutoff frequency may be used in combination with the instrument amplifier to remove excess noise. As one skilled in the art will appreciate, the low-pass filter removes all frequencies higher than a select cutoff frequency.

In use, throughout the simulated breathing cycle, the evaluating means continuously determines a desired pressure level of the gas within the interior volume 118 of the vessel 110 and continuously monitors the actual pressure within the vessel. The desired pressure level is compared to the actual pressure and the flow of gas from the positive pressure source 120 and to the vacuum pressure source 130 is regulated so that the pressure within the interior volume 118 of the vessel is maintained at the desired pressure level.

Positive pressure inside the vessel is achieved when the first regulating means is open and the second regulating means is closed. Likewise, negative pressure is obtained when the second regulating means is open and the first regulating means is closed. To simulate inhalation, the pressure inside the vessel is forced negative so that a negative pressure gradient is created from the interior of the vessel to the atmosphere. This negative pressure gradient causes gas to flow into the interior of the vessel through the breath passage port. Similarly, to simulate exhalation, the pressure inside of the interior of the vessel is forced positive so that a positive pressure gradient is established between the interior of the vessel and the atmosphere, which causes gas to flow out of the breath passage port. The length of inhalation and exhalation depends on how long the respective regulating means are opened. Also, the strength of the inhalation and exhalation depends on the pressure gradients between the interior of the vessel and the atmosphere. Thus, by maintaining the pressure level of the gases within the vessel at the desired pressure level, the flow of gas entering and exiting the breath passage port 116 of the lung simulator, and thus the flow of gas entering and exiting the "mouth" of the mannikin is synchronized with a predetermined desired flow rate of breathing for the breathing cycle.

The lung simulator 100 described above simulates inhalation and exhalation of air, which serves to adequately emulate the "breathing" of the integrated human patient simulator. However, in an alternative embodiment, the lung simulator 100 may also emulate the appropriate physiological concentration of gases during at least the exhalation phase of the breath cycle. Typically, exhalation gas mixtures have a lower concentration of oxygen ($O_2$) and a higher concentration of carbon dioxide ($CO_2$) when compared to inhalation gas mixtures. Therefore, a more realistic simulation is achieved if the individual concentrations of the gases, such as, for example, $O_2$, $CO_2$, and $N_2$, in the "breaths" are adjusted during the exhalation stage of the breathing cycle.

Figure 4:
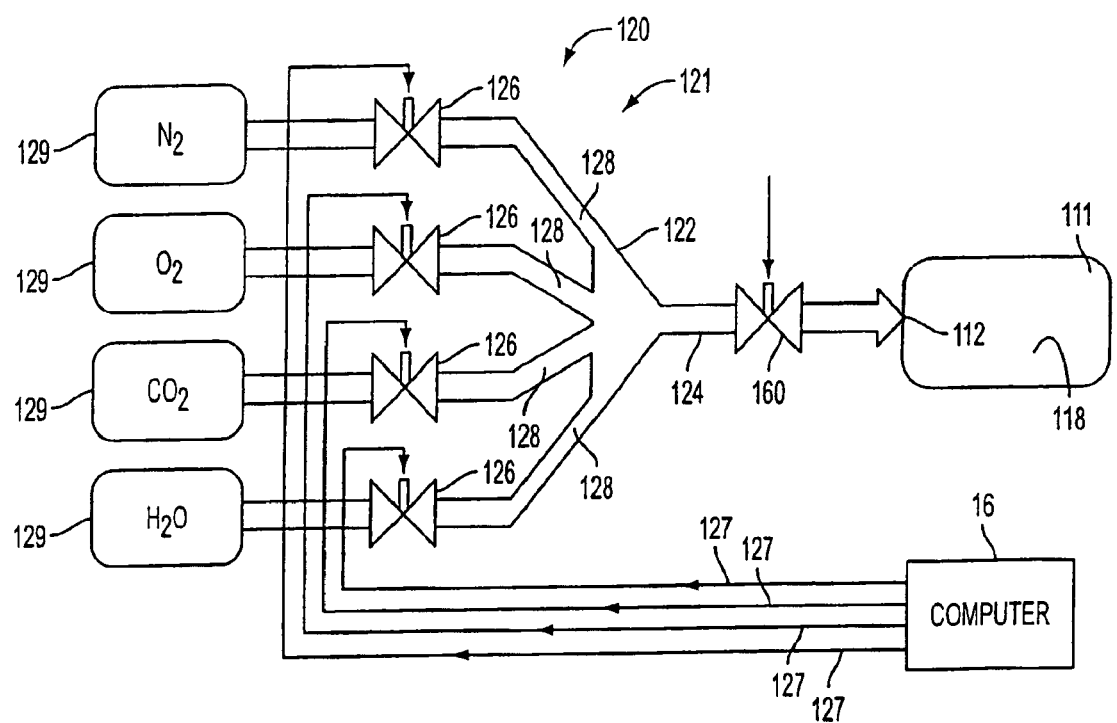
FIG. 4 is a schematic view of an embodiment of a positive pressure source of the lung simulator.

Referring to FIG. 4, in one embodiment, a conventional gas blender 121, such as described and disclosed in U.S. Pat. No. 6,273,728, which issued to Lampotang, et al., and which is incorporated by reference herein, may serve as the positive pressure source 120 of gas of the lung simulator 100. In this example, the gas blender 121 is in communication with the evaluating means so that the concentration of gases throughout the exhalation phase of the breathing cycle are regulated so that they match the desired concentration of gases determined in the physiological software models outlined above. The plenum 122 of the gas blender is in regulated communication with pressurized sources of the individual gases, such as, for example, cylinders 6 of $O_2$, $CO_2$, $N_2$, $N_2O$, etc. of the integrated human patient simulator, and the outlet 124 of the plenum 122 of the gas blender is in communication with the first regulating means of the lung simulator 100. Such a gas blender 121 mixes gases simultaneously according to their partial pressures. Here, the amount of gas flowing into the vessel 110 of the lung simulator is regulated so that the individual pressures of the gases sum up to the desired pressure setting in the interior of the vessel.

$$d=PN_2+PO_2+PCO_2+$$

where d is the desired pressure, $PN_2$, $PO_2$, $PCO_2$, etc., are partial pressures of the individually supplied gases. Thus, the "exhalation" of the mannikin would have the proper and desired concentrations of gases therein based on the physiological software modules.

In an alternative embodiment, the positive pressure source 120 of gas for the lung simulator 100 may include a plenum 122 and a plurality of plenum valves 126. The plenum has a plurality of inlet gas ports 128 and an outlet gas port 124. Each inlet gas port 128 is adapted to be in fluid communication with a supply of a desired gas 129, such as, for example, cylinders 6 of $O_2$, $CO_2$, $N_2$, $N_2O$, etc. of the integrated human patient simulator. The first regulating means of the lung simulator 100 is disposed intermediate and in fluid communication with the outlet gas port 124 of the plenum 122 and the inlet 112 of the vessel 110 to regulate the supply of pressurized gases to the vessel from the plenum of the positive pressure source 120.

Each plenum valve 126 for adjusting gas flow into the plenum 122 is disposed adjacent to and in fluid communication with one respective inlet gas port 128 of the plenum. Each plenum valve 126 is adapted to regulate the supply of gas in fluid communication with its respective inlet gas port 128. For example, usually one supply of gas is oxygen and the other supplies of gas may include air, nitrogen, helium, nitrous oxide, carbon dixide, etc., or a mixture thereof. The plenum valve 126 may be a proportional valve, in which the passage through which the gas traverses is opened different amounts corresponding to various desired flow rates, or, more preferably, a binary valve, which is in either a fully open or a fully closed position. A electric binary valve, such as Model 3121 from Parker Skinner, may be used.

Each plenum valve 126 is electrically coupled to the evaluating means of the integrated human patient simulator. The evaluating means controls the percentage composition of the desired gas exiting the plenum 122 of the positive pressure source by sequentially actuating at least one plenum valve 126. In use, each of the desired plenum valves are actuated for a predetermined period of time within an overall predetermined period of time so that the percentage composition of the desired gas in fluid communication with the inlet of the vessel is maintained at a predetermined level. The predetermined level is set by the physiological software modules and the appropriate plenum valves are continuously modulated to track the desired level of the percentage composition of gases during the "exhalation."

Each plenum valve has a driver circuit 127 electrically coupled to the evaluating means, i.e., the computer 16. The driver circuits 127 adjust the plenum valves 126 based on electrical signals received from the computer.

Figure 5:
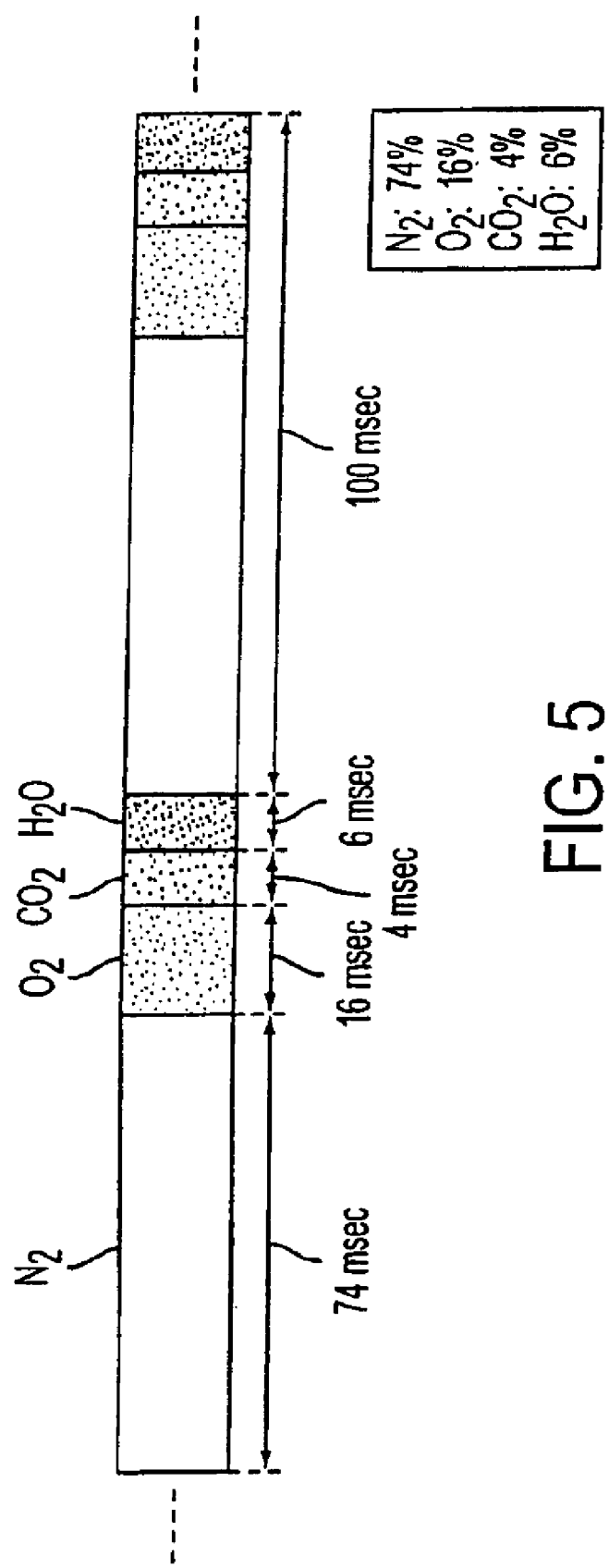
FIG. 5 shows an exemplified gas mixture packet for expired air.

In this example, the gases are mixed by allocating time unique slots to each gas. As shown in FIG. 5, the length of each time slot corresponds to the gas concentration and the sum of the time slots add up to the entire gas mixture in an individual gas mixture packet. Gas is preferably continuously supplied to the plenum 122 so that there is a constant supply of gas available from the positive pressure source 120. Typically, smaller gas mixture packets, i.e., smaller overall length of the sum of the time slots of the individual time slots, provide better mixing than larger gas mixture packets. For example, the length of each gas time slot may be determined by $$t_{gas}=c_{gas}*T_{pac}/100$$

where $t_{gas}$ is the gas time slot length, $c_{gas}$ is the gas concentration as a percentage, and $T_{pac}$ is the total gas packet (window) length that is given by $$T_{pac}=t_{N2}+t_{O2}+t_{CO2}.$$

Figure 6:
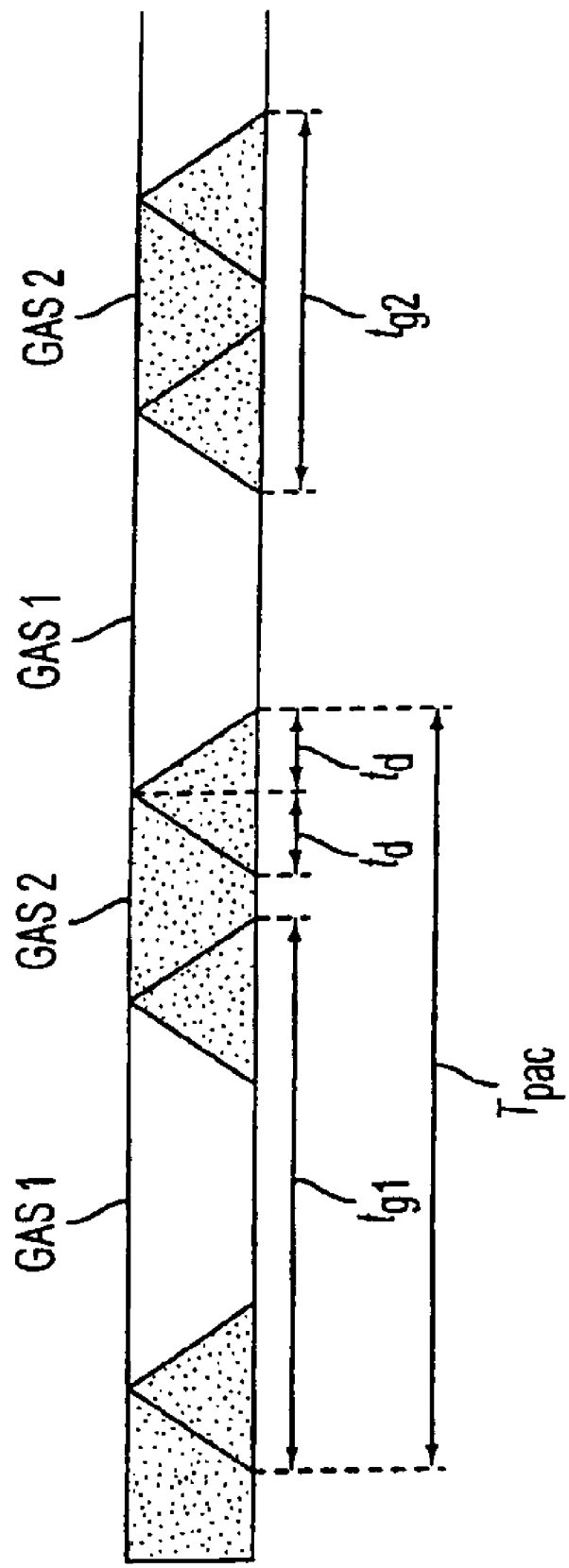
FIG. 6 shows an exemplified mixture of two gases with valve delay.

Referring now to FIG. 6, if a binary valve is used as the plenum valve 126, the time delay of the on/off valve influences when it is opened and when it is closed, should be accounted for in the algorithm for driving the time sequenced gas mixing described above. For example, FIG. 6 shows an example of time sequenced gas mixing with valve delay for an exemplary two-gas mixture where $T_{pac}$ is the total length of the gas mixture packet or total window length, $t_{g1}$ is the time slot length of gas one, $t_{g2}$ is the time slot length of gas two, $t_d$ is the delay time for the respective plenum valve 126 to either open or close, and t is the current counter time. The variable t stores the current time progression within the individual gas packet. When the entire gas packet has been supplied to the plenum 122, t is reset to indicate the transmission of a new gas packet. These steps are repeated throughout the exhalation phase of the lung simulator 100. Due to the time delay of $t_d$, the plenum valve 126 for the second gas must be opened $t_d$ seconds before the plenum valve 126 for the first gas is closed. As one will appreciate, the length of a time slot must be greater than the delay time.

Although the illustrative embodiments of the present disclosure have been described herein with reference to the accompanying drawings, it is to be understood that the disclosure is not limited to those precise embodiment, and that various other changes and modifications may be affected therein by one skilled in the art without departing from the scope of spirt of the disclosure. All such changes and modifications are intended to be included within the scope of the disclosure as defined by the appended claims.

What is claimed is:

1. A lung simulator for simulating breathing in real time during a breathing cycle in a patient simulator, comprising:

a. a positive pressure source of a gas;

b. a vacuum pressure source;

c. a vessel having an inlet, a outlet, and a breath passage port, the vessel defining a fixed interior volume, the inlet in communication with the positive pressure source and the outlet in communication with the vacuum pressure source;

d. a plurality of regulating means, a first regulating means disposed intermediate and in fluid communication with the positive pressure source and the inlet of the vessel, and a second regulating means disposed intermediate and in fluid communication with the vacuum pressure source and the outlet of the vessel;

e. a pressure sensor, disposed in communication with the interior volume of the vessel, wherein the pressure sensor generates a pressure signal based on the measured pressure of the gas within the vessel;

f. means for continuously evaluating a desired pressure level within the vessel, based upon any one of i) a time and event based script, ii) a computer model, and iii) a combination of a time and event based script and a computer model based on a physiological state of a simulated patient, during the breathing cycle such that a flow of gas entering and exiting the breath passage port of the vessel is synchronized with a predetermined desired flow rate of breathing for the breathing cycle, wherein the evaluating means compares the pressure signal to the desired pressure level and generates a response signal based on the comparison; and g. feedback means, responsive to the pressure signal, adapted to adjust at least one of the regulating means so that the pressure within the interior volume of the vessel is maintained at the desired pressure level.

2. The lung simulator of claim 1, wherein the positive pressure source of gas comprises:

a plenum having a plurality of inlet gas ports and an outlet gas port, each inlet gas port being adapted to be in fluid communication with a supply of a desired gas, the first regulating means disposed intermediate and in fluid communication with the outlet gas port of the plenum and the inlet of the vessel; and a plurality of plenum valves, each plenum valve in communication with one respective inlet gas port of the plenum, wherein each plenum valve is electrically coupled to the evaluating means, wherein the evaluating means controls the percentage composition of the desired gas exiting from the plenum, the evaluating means determining a desired percentage composition of the gas exiting the plenum based upon any one of i) a time and event based script, ii) a computer model, and iii) a combination of a time and event based script and a computer model based on a physiological state of a simulated patient, during the breathing cycle, wherein the evaluating means sequentially generates at least one gas signal based on the comparison and communicates the gas signal to at least one plenum valve, the plenum valve being actuated for a predetermined segment of time within a predetermined period of time such that the percentage composition of the desired gas in fluid communication with the inlet of the vessel is maintained at a predetermined level.

3. A lung simulator for simulating breathing in real time during a breathing cycle in a patient simulator, comprising:

a. a positive pressure source of a gas;

b. a vacuum pressure source;

c. a vessel having an inlet, a outlet, and a breath passage port, the vessel defining a fixed interior volume, the inlet in communication with the positive pressure source and the outlet in communication with the vacuum pressure source;

d. a plurality of regulating means, a first regulating means disposed intermediate and in fluid communication with the positive pressure source and the inlet of the vessel, and a second regulating means disposed intermediate and in fluid communication with the vacuum pressure source and the outlet of the vessel;

e. a pressure sensor, disposed in communication with the interior volume of the vessel, wherein the pressure sensor generates a pressure signal based on the measured pressure of the gas within the vessel; and f. means for continuously evaluating a desired pressure level within the vessel, based upon any one of i) a time and event based script, ii) a computer model, and iii) a combination of a time and event based script and a computer model based on a physiological state of a simulated patient, during the breathing cycle such that a flow of gas entering and exiting the breath passage port of the vessel is synchronized with a predetermined desired flow rate of breathing for the breathing cycle.

4. The lung simulator of claim 3, wherein the evaluating means compares the pressure signal to the desired pressure level and generates a response signal based on the comparison.

5. The lung simulator of claim 4, further comprising feedback means, responsive to the pressure signal, adapted to adjust at least one of the regulating means so that the pressure within the interior volume of the vessel is maintained at the desired pressure level.

6. The lung simulator of claim 5, wherein the evaluating means comprises a microprocessor coupled to the pressure sensor.

7. The lung simulator of claim 6, wherein the feedback means comprises at least one driver circuit electrically coupled to the microprocessor and also electrically coupled to each regulating means, wherein the driver circuits adjust the regulating means based on electrical signals received from the microprocessor to vary the flow rate of gas passed through the respective regulating means during the breathing cycle.

8. The lung simulator of claim 3, wherein each regulating means comprises a flow valve.

9. The lung simulator of claim 8, wherein the flow valve is a proportional flow valve.

10. The lung simulator of claim 3, wherein the positive pressure source of gas comprises:

a plenum having a plurality of inlet gas ports and an outlet gas port, each inlet gas port being adapted to be in fluid communication with a supply of a desired gas, the first regulating means disposed intermediate and in fluid communication with the outlet gas port of the plenum and the inlet of the vessel; and a plurality of plenum valves, each plenum valve in communication with one respective inlet gas port of the plenum, wherein each plenum valve is electrically coupled to the evaluating means, wherein the evaluating means controls the percentage composition of the desired gas exiting from the plenum, the evaluating means sequentially actuating at least one plenum valve, the plenum valve being actuated for a predetermined segment of time within a predetermined period of time so that the percentage composition of the desired gas in fluid communication with the inlet of the vessel is maintained at a predetermined level.

11. The lung simulator of claim 10, wherein the plenum valve is a binary valve.

12. A lung simulator for simulating breathing in real time during a breathing cycle in a patient simulator, comprising:

a. a positive pressure source of a gas;

b. a vacuum pressure source;

c. a vessel having an inlet, a outlet, and a breath passage port, the vessel defining a fixed interior volume, the inlet in communication with the positive pressure source and the outlet in communication with the vacuum pressure source;

d. a plurality of regulating means, a first regulating means disposed intermediate and in fluid communication with the positive pressure source and the inlet of the vessel, and a second regulating means disposed intermediate and in fluid communication with the vacuum pressure source and the outlet of the vessel;

e. a pressure sensor, disposed in communication with the interior volume of the vessel, wherein the pressure sensor generates a pressure signal based on the measured pressure of the gas within the vessel; and f. means for continuously evaluating the pressure signal to a predetermined desired pressure level within the vessel during the breathing cycle such that a flow of gas entering and exiting the breath passage port of the vessel is synchronized with a predetermined desired flow rate of breathing for the breathing cycle.

13. The lung simulator of claim 12, wherein the evaluating means calculates the predetermined desired pressure level based upon any one of i) a time and event based script, ii) a computer model, and iii) a combination of a time and event based script and a computer model based on a physiological state of a simulated patient.

14. The lung simulator of claim 12, wherein the evaluating means generates a response signal based on the comparison of the pressure signal to the predetermined desired pressure level.

15. The lung simulator of claim 14, further comprising feedback means, responsive to the pressure signal, adapted to adjust at least one of the regulating means so that the pressure within the interior volume of the vessel is maintained at the predetermined desired pressure level.

16. The lung simulator of claim 12, wherein the positive pressure source of gas comprises:
   a plenum having a plurality of inlet gas ports and an outlet gas port, each inlet gas port being adapted to be in fluid communication with a supply of a desired gas, the first regulating means disposed intermediate and in fluid communication with the outlet gas port of the plenum and the inlet of the vessel; and
   a plurality of plenum valves, each plenum valve in communication with one respective inlet gas port of the plenum, wherein each plenum valve is electrically coupled to the evaluating means, wherein the evaluating means controls the percentage composition of the desired gas exiting from the plenum, the evaluating means sequentially actuating at least one plenum valve, the plenum valve being actuated for a predetermined segment of time within a predetermined period of time so that the percentage composition of the desired gas in fluid communication with the inlet of the vessel is maintained at a predetermined level.

17. A lung simulator for simulating breathing in real time during a breathing cycle in a patient simulator, comprising:
   a. a positive pressure source of a gas;
   b. a vacuum pressure source;
   c. a vessel having an inlet port, a outlet, and a breath passage port, the vessel defining a fixed interior volume, the inlet in communication with the positive pressure source and the outlet in communication with the vacuum pressure source;
   d. a plurality of flow valves that includes a first flow valve and a second flow valve, each flow valve defining a passage adapted to adjust the flow rate of a gas therethrough, the first flow valve disposed intermediate and in fluid communication with the positive pressure source and the inlet of the vessel, and the second flow valve disposed intermediate and in fluid communication with the vacuum pressure source and the outlet of the vessel;
   e. a pressure sensor disposed in communication with the interior volume of the vessel, wherein the pressure sensor generates an output based on the measured pressure of the gas within the vessel;
   f. a microprocessor for controlling a flow of gas entering and exiting the outlet port of the vessel during the breathing cycle, wherein the microprocessor determines a desired pressure level within the vessel, based upon any one of i) a time and event based script, ii) a computer model, iii) or a combination of a time and event based script and a computer model based on a physiological state of a simulated patient.

18. The lung simulator of claim 17, wherein the microprocessor is electrically coupled to the output of the pressure sensor and the first and second flow valves, wherein the microprocessor compares the output of the pressure sensor to the desired pressure level, generates a response signal based on the comparison, and communicates the response signal to at least one of the first and second flow control valves so that the pressure within the interior volume of the vessel is maintained at the desired pressure level.

19. The lung simulator of claim 18, wherein the positive pressure source of gas comprises:
   a plenum having a plurality of inlet gas ports and an outlet gas port, each inlet gas port being adapted to be in fluid communication with a supply of a desired gas, the first regulating means disposed intermediate and in fluid communication with the outlet gas port of the plenum and the inlet of the vessel; and
   a plurality of plenum valves, each plenum valve in communication with one respective inlet gas port of the plenum, wherein each plenum valve is electrically coupled to the evaluating means, wherein the evaluating means controls the percentage composition of the desired gas exiting from the plenum, the evaluating means sequentially actuating at least one plenum valve, the plenum valve being actuated for a predetermined segment of time within a predetermined period of time so that the percentage composition of the desired gas in fluid communication with the inlet of the vessel is maintained at a predetermined level.

20. The lung simulator of claim 18, wherein each flow valve is a proportional valve.

21. The lung simulator of claim 19, wherein each plenum valve is a binary valve.

22. A method of simulating a lung in real time in a patient simulator during simulated medical procedures using a mannikin, comprising the steps of:
   a) providing a vessel having a fixed interior volume, an inlet, an outlet, and a breath passage port;
   b) providing a positive pressure source in communication with the inlet of the vessel;
   c) providing a vacuum pressure source in communication with the outlet of the vessel;
   d) continuously monitoring the pressure within the interior volume of the vessel;
   e) continuously evaluating a desired pressure level within the interior volume of the vessel so that a flow of gas entering and exiting the breath passage port during a breathing cycle is synchronized with a predetermined desired flow rate of breathing for the breathing cycle;
   f) comparing the monitored pressure to the desired pressure level; and
   g) regulating the flow of gas from the positive pressure source and to the vacuum pressure source so that the pressure within the interior volume of the vessel is maintained at the desired pressure level.

* * * * *